(12) United States Patent  
Suzuki

(10) Patent No.: US 9,100,568 B2  
(45) Date of Patent: Aug. 4, 2015

(54) IMAGE PICKUP APPARATUS AND CONTROL METHOD THEREOF FOR CONTROLLING TIMING DURING CONTINUOUS SHOOTING

(71) Applicant: CANON KABUSHIKI KAISHA, Tokyo (JP)

(72) Inventor: Yasuyuki Suzuki, Tokyo (JP)

(73) Assignee: Canon Kabushiki Kaisha, Tokyo (KR)

( * ) Notice: Subject to any disclaimer, the term of this patent is extended or adjusted under 35 U.S.C. 154(b) by 106 days.

(21) Appl. No.: 13/773,250

(22) Filed: Feb. 21, 2013

(65) Prior Publication Data  
US 2013/0182172 A1 Jul. 18, 2013

Related U.S. Application Data

(63) Continuation of application No. PCT/JP2012/076828, filed on Oct. 17, 2012.

(30) Foreign Application Priority Data

Oct. 17, 2011 (JP) ................. 2011-227971

(51) Int. Cl.  
*H04N 5/232* (2006.01)  
*G02B 7/28* (2006.01)  
*G02B 7/34* (2006.01)  
*G03B 13/36* (2006.01)  
*G03B 13/00* (2006.01)

(52) U.S. Cl.  
CPC ............. *H04N 5/23212* (2013.01); *G02B 7/28* (2013.01); *G02B 7/34* (2013.01); *G03B 13/36* (2013.01)

(58) Field of Classification Search  
USPC .......................... 348/345, 349, 350  
See application file for complete search history.

(56) References Cited

U.S. PATENT DOCUMENTS 5,937,216 A * 8/1999 Homma et al. ................. 396/95  
6,148,153 A * 11/2000 Kusaka et al. ................ 396/123  
8,018,498 B2 * 9/2011 Takagi et al. ............... 348/222.1

FOREIGN PATENT DOCUMENTS

| JP | 63-172235 A | | 7/1988 | |
|---|---|---|---|---|
| JP | 6-186473 A | | 7/1994 | |
| JP | 8-152551 A | | 6/1996 | |
| JP | 9-311269 A | | 12/1997 | |
| JP | 2000-089091 A | | 3/2000 | |
| JP | 2001-021794 A | | 1/2001 | |
| JP | 2001-264623 A | | 9/2001 | |
| JP | 2001264623 | * | 9/2001 | ............... G01C 3/06 |
| JP | 2008-191575 A | | 8/2008 | |

* cited by examiner

*Primary Examiner* — Ngoc-Yen Vu  
(74) *Attorney, Agent, or Firm* — Canon USA Inc IP Division

(57) ABSTRACT

A focus detecting device that addresses unstableness in frame rate by performing optimal focus detection depending on a frame rate setting, an AF frame selection setting, and a shooting speed priority/focus priority setting is provided.

A focus adjusting device includes means for storing an object signal in an AF sensor; focus detecting means for detecting a defocus amount from the object signal; and focus adjusting means for adjusting the focus of an image taking lens based on the defocus amount. The focus adjusting device also includes a readout time adjusting means for adjusting processing of waiting for a predetermined time since the AF sensor starts storing until the object signal is read out.

10 Claims, 14 Drawing Sheets

Prior Art

IMAGE PICKUP APPARATUS AND CONTROL METHOD THEREOF FOR CONTROLLING TIMING DURING CONTINUOUS SHOOTING

CROSS-REFERENCE TO RELATED APPLICATIONS

This application is a Continuation of International Patent Application No. PCT/JP2012/076828, filed Oct. 17, 2012, which claims the benefit of Japanese Patent Application No. 2011-227971, filed Oct. 17, 2011, both of which are hereby incorporated by reference herein in their entirety.

TECHNICAL FIELD

The present invention relates to a focus adjusting device and an image pickup apparatus.

BACKGROUND ART

There is a focus detecting device. An AF sensor stores an object image passing through an image taking lens as an object image signal. The focus detecting device detects a defocus amount based on the object image signal output from the AF sensor.

When a moving object is continuously focused, there is a function that detects the focus every single frame, which is single shooting of continuous shooting (rapid-fire shooting), predicts an object moving position in future from the viewpoint of the detection, and moves the image taking lens.

Since the lens is driven by taking into account the prediction calculation result by the object-position prediction function, even the moving object can be continuously focused.

For example, Japanese Patent Laid-Open No. 2001-021794 discloses the control that drives the image taking lens in association with the movement of the moving object.

The control is performed such that a focus detection operation is completed while the object image reaches the AF sensor by moving a mirror from an up state to a down state, and that the image taking lens is driven and an aperture stop is adjusted before an image pickup element is exposed to light by moving the mirror from the down state to the up state. The focus detection operation includes storing the object signal in the AF sensor, reading out the object image signal, performing correlative calculation based on the read out object image signal, and performing prediction calculation. Also, a time while the mirror is moved down is called AF available time.

To maintain the number of shooting times per unit time of continuous shooting (hereinafter, also referred to as frame rate), the focus detection operation has to be ended within a predetermined time. However, the storage of the object signal in the AF sensor may take a time depending on the shooting environment (object brightness, contrast), and the readout of the signal and the prediction calculation may take a time depending on the number of AF frames. As the result, the frame rate may become unstable. In particular, if rapid-fire shooting is performed at high speed, the AF available time that can maintain the frame rate is reduced, and hence the frame rate likely becomes unstable.

To maintain the frame rate, for example, PTL 1 discloses means for reducing the time for the focus detection by recognizing a time for storing electric charges in an AF sensor in a selected focus detection area and setting the upper limit for a time for storing electric charges in another AF sensor.

There is control that individually compares a storage signal stored in the AF sensor by photoelectric conversion with a predetermined signal level, and stops the storage operation if the storage signal reaches the predetermined signal level (hereinafter, referred to as storage monitoring control).

In the storage monitoring control of the AF sensor, a constant time is waited from when the storage of electric charges in each line sensor is started until the electric charges are read out, then the storage monitoring control of each of a plurality of AF sensors is ended, and then electric-charge readout control is performed.

FIG. 18A is an illustration showing the storage monitoring control when a storage signal of a line sensor A is read out before the storage of electric charges in a line sensor B is completed. Regarding the AF sensor, the storage monitoring control for the line sensors is stopped during readout of the line sensor A. Owing to this, even if the storage of electric charges in the line sensor B satisfies a storage completion condition, the storage of electric charges in the line sensor B cannot be stopped. Hence, the signal stored in the line sensor B may be saturated after readout of the line sensor A and before the storage monitoring control is started again. Therefore, as shown in FIG. 18B, the waiting time for the storage monitoring control is set to be a long time so that storage stop processing is properly performed even when the storage of electric charges in the line sensor B is completed at the timing of FIG. 18A. By setting the storage completion condition as described above, the line sensor B can be prevented from being saturated. Japanese Patent Laid-Open No. 8-152551 discloses the detail of the AF sensor.

CITATION LIST

Patent Literature

PTL 1 Japanese Patent Laid-Open No. 9-311269

With the above-described related art, the line sensor B is prevented from being saturated and focus detection accuracy is ensured. However, a focus detection time is extended. Also, the frame rate may become likely unstable (FIG. 4A).

SUMMARY OF INVENTION

In the light of the problems, according to a technical idea, an image pickup apparatus available for continuous shooting includes a sensor that performs photoelectric conversion in accordance with an object image, stores electric charges, and outputs an object signal; focus detecting means for detecting a defocus amount from the object signal; focus adjusting means for performing focus adjustment for an image taking lens based on the defocus amount; and control means for controlling the sensor so that, during the continuous shooting, the sensor outputs the object signal after a predetermined time elapses since the sensor starts storing the electric charges, the predetermined time varying in accordance with the number of shooting times per unit time set by a user.

Also, according to another technical idea, an image pickup apparatus including a plurality of AF frames includes a sensor that performs photoelectric conversion in accordance with an object image, stores electric charges, and outputs an object signal; focus detecting means for detecting a defocus amount from the object signal; focus adjusting means for performing focus adjustment for an image taking lens based on the defocus amount; changing means for changing a selection subject of an AF frame used for the focus adjustment of the image taking lens from the plurality of AF frames; and control means for controlling the sensor so that the sensor outputs the object signal after a predetermined time elapses since the sensor starts storing the electric charges, the predetermined time varying in accordance with the change by the changing means.

Further features of the present invention will become apparent from the following description of exemplary embodiments with reference to the attached drawings.

DESCRIPTION OF EMBODIMENTS

Figure 1:
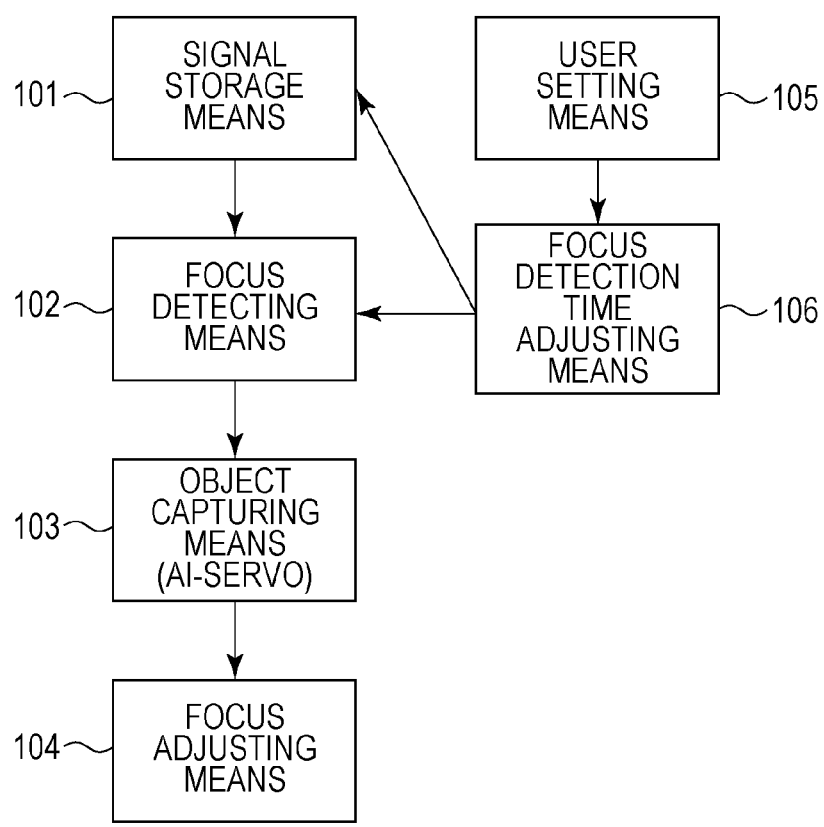
FIG. 1 is a block diagram showing a concept of a focus detecting device.

One of preferable embodiments of the invention is described in detail below with reference to the accompanying drawings. FIG. 1 is a block diagram showing a concept of a focus detecting device. Signal storage means 101 corresponds to AF sensors 229a and 229b in FIG. 3 formed of a pair of photoelectric conversion element arrays which receive an object image. Focus detecting means 102 for detecting a defocus amount from an object signal, and focus adjusting means 104 for adjusting the focus of an image taking lens based on the defocus amount are included. Also, object capturing means 103 for causing the image taking lens to be continuously focused on a moving object is included. Also, user setting means 105 for individually setting a frame rate setting, which affects the set frame rate, an AF frame selection setting, and shooting speed priority/focus priority is included. Further, the focus is detected by focus detection time adjusting means 106 for adjusting a time from the signal storage means to the focus adjusting means (hereinafter, referred to as focus detection time) depending on the user setting.

FIRST EMBODIMENT

A first embodiment of the invention is described below.
Block Diagram

Figure 2:
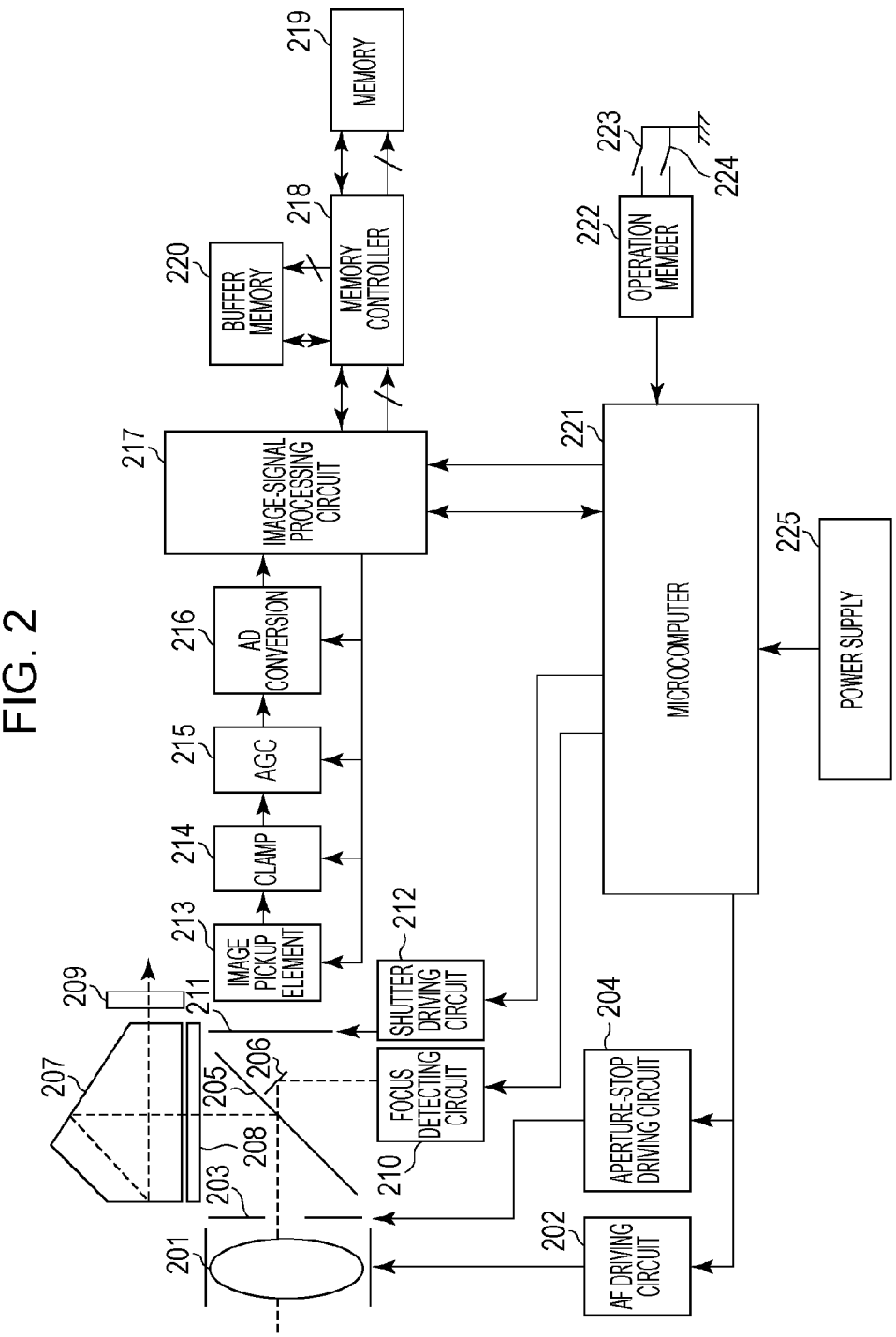
FIG. 2 is a block diagram showing a configuration of a single-lens reflex camera.

FIG. 2 is a block diagram showing a configuration of a single-reflex lens camera according to the first embodiment. An AF (auto-focus) driving unit 202 is included. The AF driving circuit 202 is formed of, for example, a DC motor or an ultrasonic motor, and adjusts the focus by changing the position of a focus lens of an image taking lens 201 under control of a microcomputer 221. An aperture-stop driving circuit 204 drives an aperture stop 203. The microcomputer 221 calculates an amount to be driven, and changes an optical aperture value. A main mirror 205 can shift a light beam incident from the image taking lens 201 to a finder side and to an image pickup element side. For example, when shooting is performed, the main mirror jumps up is retracted from the light beam to guide the light beam to an image pickup element 213. Also, the main mirror 205 is a half mirror so that a center portion thereof can transmit part of the light, to transmit part of the light beam to be incident on the pair of AF sensors 229a and 229b for the focus detection.

A sub-mirror 206 is a member that reflects the light beam transmitted through the main mirror 205 and guides the light beam to the pair of AF sensors (arranged in a focus detecting circuit 210) 229a and 229b for performing the focus detection. A view finder includes a pentagonal prism 207, a focusing glass 208, an eyepiece 209, etc. The light beam transmitted through the center portion of the mirror 205 and reflected by the sub-mirror 206 reaches the pair of AF sensors 229a and 229b which are arranged in the focus detecting circuit 210 and perform photoelectric conversion. A defocus amount indicative of a focus adjustment state of the image taking lens with respect to an object is obtained by calculating the outputs of the pair of AF sensors 229a and 229b. The microcomputer 221 evaluates the calculation results and instructs the AF driving circuit 202 to cause the AF driving circuit 202 to drive the focus lens. A shutter driving circuit 212 drives a focal plane shutter 211. The microcomputer 221 controls the opening time of the shutter. The image pickup element 213 uses a CCD or a CMOS, and converts the object image formed by the image taking lens 201 into an electric signal. An auto gain control circuit 215 (AGC 215) is provided. A clamp circuit 214 and a storage monitoring circuit 215 perform basic analog signal processing before A/D conversion. The microcomputer 221 changes a clamp level and a storage monitoring reference level. An A/D converter 216 converts an analog output signal of the image pickup element 213 into a digital signal. An image-signal processing circuit 217 is realized by a logic device such as a gate array. The image-signal processing circuit 217 performs filter processing, color conversion processing, gamma processing, and compression processing such as JPEG on digitalized image data, and outputs the image data to a memory controller 218.

The image-signal processing circuit 217 may output information such as exposure information and white balance of the signal of the image pickup element 213 to the microcomputer 221 if necessary. The microcomputer 221 makes instructions for the white balance and the gain adjustment based on the information. In the continuous shooting operation, shot data is once stored in a buffer memory 220 while images are not processed yet, the unprocessed image data is read out through the memory controller 218, and is processed with image processing and compression processing by the image-signal processing circuit 217. Thus, the continuous shooting is performed. The number of continuous shooting images depends on the size of the buffer memory 220.

The memory controller 218 stores the unprocessed digital image data, which is input from the image-signal processing circuit 217, in the buffer memory 220, and stores the processed digital image data in a memory 219. Also, the memory controller 218 outputs the image data from the buffer memory 220 or the memory 219 to the image-signal processing circuit 217. The memory 219 may be removable. Reference sign 221 denotes the microcomputer. An operation member 222 transmits its state to the microcomputer 221. The microcomputer 221 controls respective units in accordance with a change in the operation member. Also, the operation member 222 can make a switching operation among ONE SHOT mode suitable for shooting a stationary object, AI-SERVO mode suitable for shooting an object the shooting distance of which continuously changes, and AI-FOCUS mode in which the camera automatically changes the mode from ONE SHOT to AI-SERVO depending on the state of an object. A switch SW1 (223, hereinafter, also referred to as SW1) and a switch SW2 (224, hereinafter, also referred to as SW2) are switches that are turned ON/OFF with an operation of a release button. Each of the switches SW1 and SW2 is one of input switches of the operation member 222. When only the switch SW1 is turned ON, the release button is in a half press state. In this state, an operation of auto-focus and a photometric operation are performed.

When both the switches SW1 and SW2 are turned ON, the release button is in a full press state, which is a release-button ON state for recording an image. Shooting is performed in this state. Also, while the switches SW1 and SW2 are continuously turned ON, the continuous shooting operation is performed. In addition, the operation member 222 is connected to switches (not shown), such as an ISO setting button, an image size setting button, an image quality setting button, and an information display button, and detects the states of the switches. Reference sign 225 denotes a power supply. The power supply 225 supplies power required for respective ICs and driving systems.

Overview of Focus Detecting Circuit 210

Figure 3:
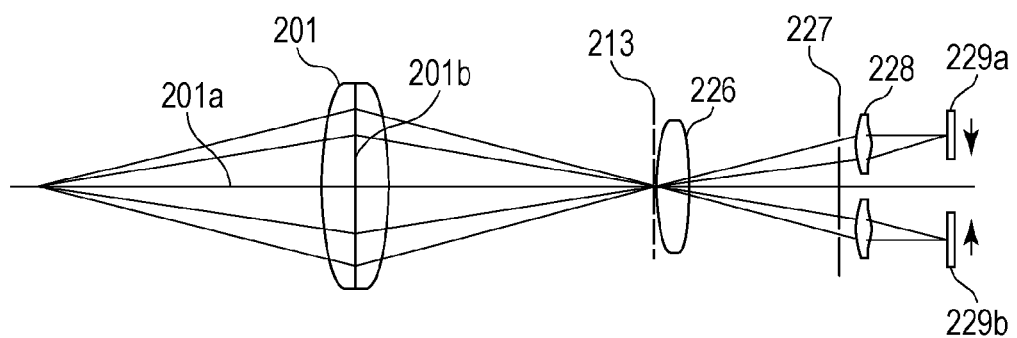
FIG. 3 is an illustration showing a focus detection operation of phase-difference system.

FIG. 3 illustrates a brief configuration of the focus detecting circuit 210. The same components as the components in FIG. 2 refer to the same reference signs as the reference signs in FIG. 2. Also, FIG. 3 illustrates the respective components while being developed on the optical axis of the image taking lens 201. However, the main mirror 205 and the sub-mirror 206 are omitted in FIG. 3.

The focus detecting circuit 210 includes a field lens 226, an aperture stop 227 having a pair of openings, a pair of secondary imaging lenses 228, and the AF sensors 229a and 229b, which are formed of a pair of photoelectric conversion element arrays or the like.

A light beam emitted from a point on an optical axis 201a passes through the image taking lens 201, then forms an image on the image pickup element 213, and also forms images with a constant distance provided between the formed images on the pair of AF sensors 229a and 229b through the field lens 226, the aperture stop 227, and the secondary imaging lenses 228.

The field lens 226 is arranged so that images are formed on a pupil 201b of the image taking lens 201, and on entrance pupils of the pair of secondary imaging lenses 228, i.e., at positions near the aperture stop 227. The pupil 201b of the image taking lens 201 is divided in the vertical direction in the drawing to correspond to the pair of openings of the aperture stop 227. In this configuration, for example, when the image taking lens 201 is moved leftward in the drawing, the light beam forms an image at a left side of the image pickup element 213. At this time, the pair of images on the pair of AF sensors 229a and 229b are displaced in directions indicated by arrows. The AF sensors 229a and 229b detect relative displacements of the pair of images. Hence the AF sensors 229a and 229b can perform the focus detection of the image taking lens 201 and focus-adjustment driving of the image taking lens 201. When the image taking lens 201 is moved rightward in the drawing, the pair of images on the pair of AF sensors 229a and 229b are displaced in directions opposite to the directions indicated by arrows in the drawing.

The focus detection of the image taking lens 201 is performed by using the above-described focus detecting circuit 210.

The camera with the above-described configuration controls the AF sensors 229a and 229b for the optimal focus detection.

Control of AF Sensors 229a, 229b

Next, the control of the AF sensors 229a and 229b is described with reference to FIG. 1.

In the focus detection of the AF sensors 229a and 229b, storage is started, and then the process waits for a constant time for performing storage monitoring control. Then, electric charges stored in the AF sensors 229a and 229b are read out. This is the control method.

In this case, if a user setting likely causes the frame rate to be unstable because the focus detection time is extended, the signal is read out more quickly. Accordingly, the focus detection time is reduced by taking into account the balance between the storage monitoring control and the focus detection time. Thus, the unstableness in frame rate is reduced.

The storage monitoring control time is reduced in accordance with the frame rate set by the user, and hence the focus detection time is reduced.

Influence of Difference in Frame Rate

Figure 4A:
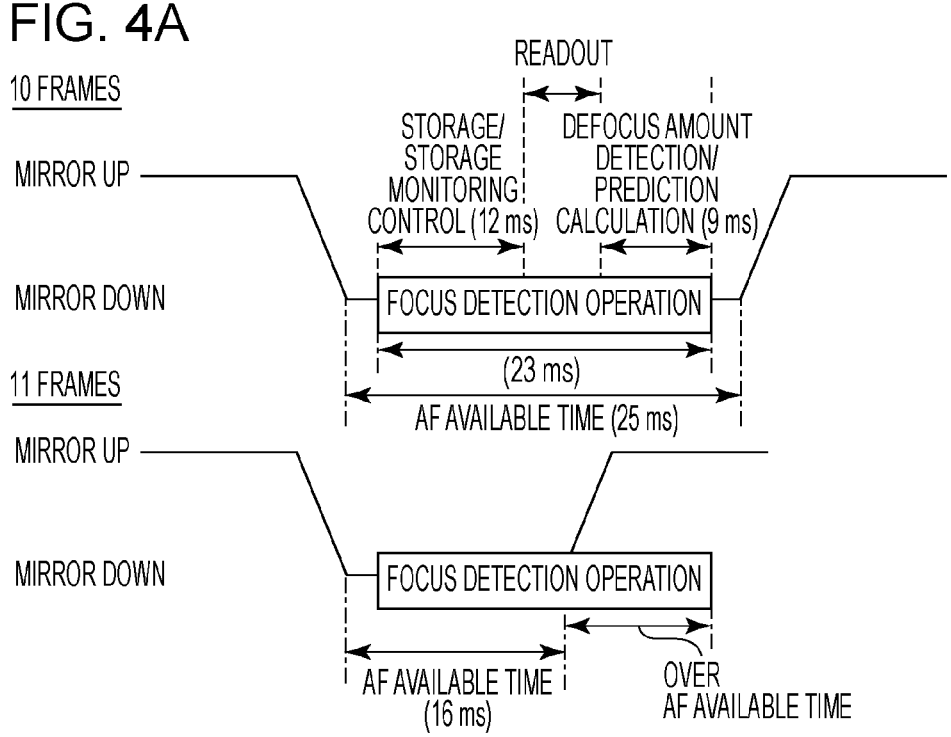
FIGS. 4A and 4B provide illustrations showing a state in which a frame rate becomes unstable when the frame rate is increased.

FIG. 4A provides an illustration showing a time per frame in which the focus detection operation can be performed if the frame rate is 10 frames, and an illustration showing a time per frame in which the focus detection operation can be performed if the frame rate is 11 frames. If the frame rate is 10 frames, the AF available time for a single frame is 25 ms, and the focus detection time takes 23 ms, the focus detection time is within the AF available time. In contrast, if the frame rate is 11 frames, and the focus detection time is the same as that of 10 frames, the focus detection time is not within 16 ms of the AF available time.

Then, the camera increases the AF available time, and the frame rate becomes a value smaller than 11 frames. In this case, the waiting time for the storage monitoring control is reduced and hence the start timing for reading out the signal is advanced, so that the focus detection time becomes within the AF available time.

Figure 4B:
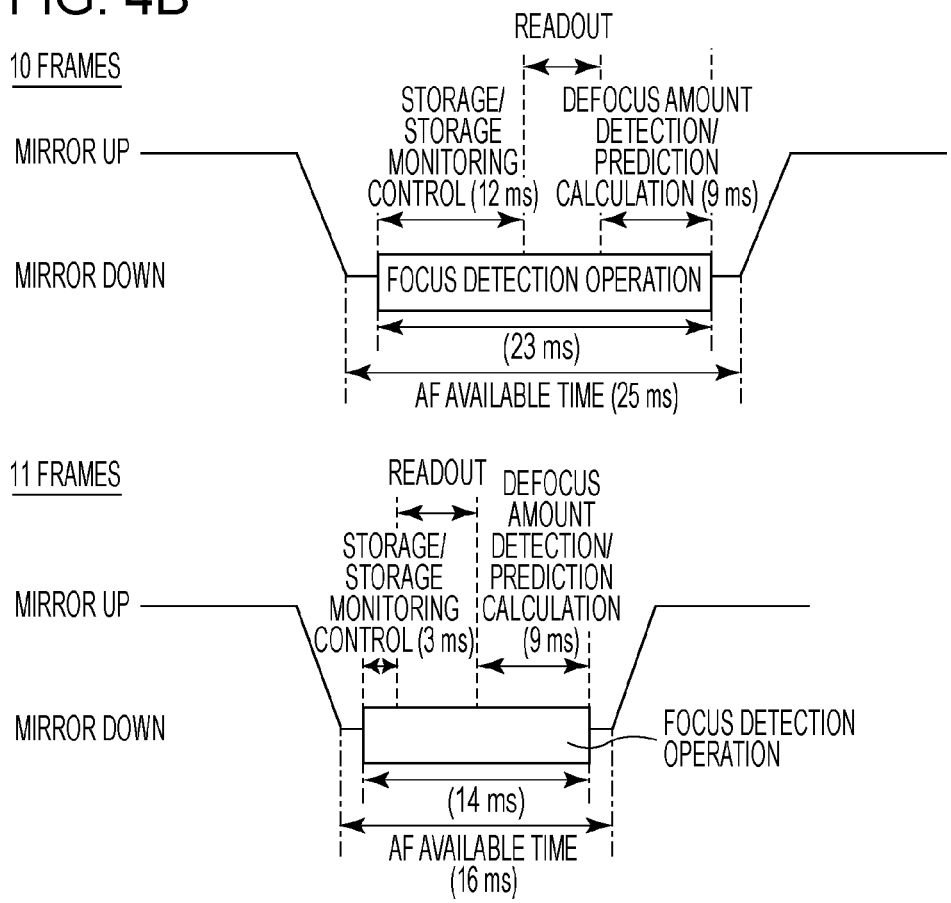

FIG. 4B is an illustration showing a state in which the waiting time for the storage monitoring control is reduced to be 3 ms and hence the start timing for reading out the signal is advanced, so that the focus detection time (14 ms) becomes within the AF available time (16 ms).

By reducing the waiting time for the storage monitoring control, the start timing for reading out the signal of the line sensor, which has completed the storage before the waiting time for the storage monitoring control, can be advanced. However, the storage monitoring control of the other line sensor is stopped during readout. Then, the storage signal of the other line senor may be saturated even if the storage monitoring control is re-started from the stop state.

Thus, the waiting time for the storage monitoring control is reduced. Then, for example, even if the line sensor read out second or later is saturated, the storage signal of the line sensor read out in advance is not saturated. Accordingly, the defocus amount can be obtained by using at least one line sensor that is not saturated.

As described above, since the focus detection time is reduced by reducing the waiting time for the storage monitoring control, the focus detection time becomes within the AF available time and the unstableness in frame rate is reduced.

Processing for Reducing Waiting Time for Storage Monitoring Control

Figure 8:
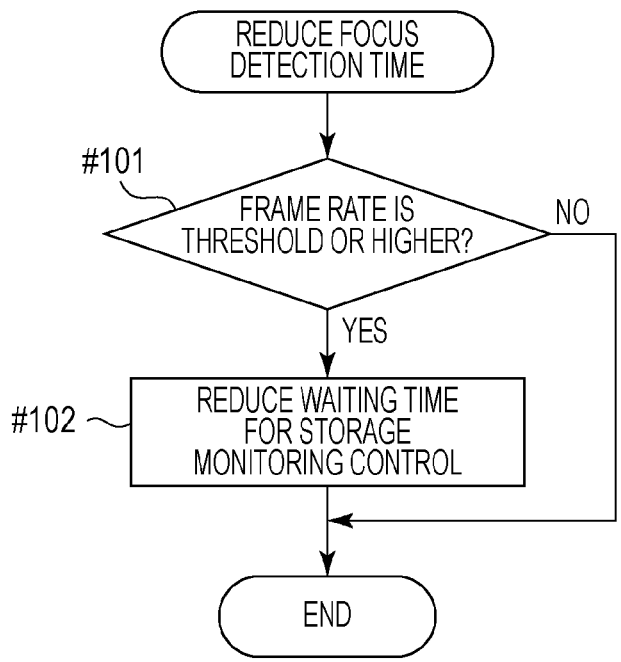
FIG. 8 is a flowchart showing processing for adjusting a waiting time for storage monitoring control in accordance with a frame rate setting set by a user.

FIG. 8 is a flowchart showing processing for reducing the waiting time for the storage monitoring control in accordance with the frame rate setting set by the user.

In step #101, if the frame rate set by the user is higher than a certain threshold, the processing goes to step #102. In step #102, the waiting time for the storage monitoring control is set to be shorter than the current time. If the frame rate is lower than the certain threshold in step #101, the processing is ended while the current waiting time for the storage monitoring control is not changed.

Generation of Unstableness in Frame Rate

Figure 5A:
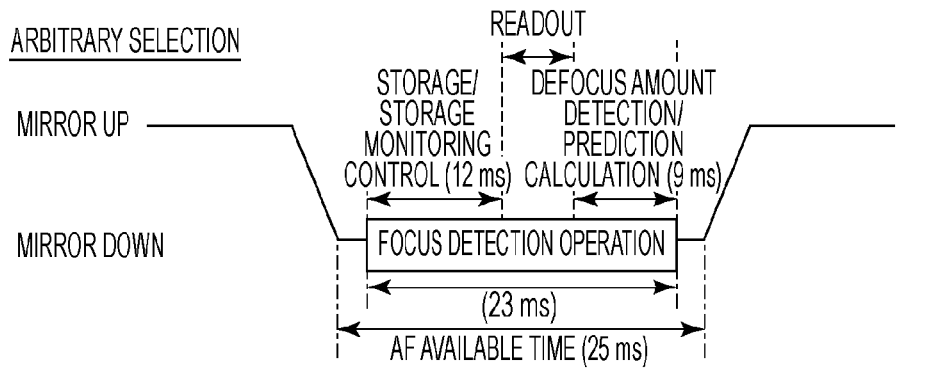
FIGS. 5A and 5B provide illustrations showing a state in which the frame rate becomes unstable when the number of storage times or readout times in or from an AF sensor is increased.
Figure 5A:
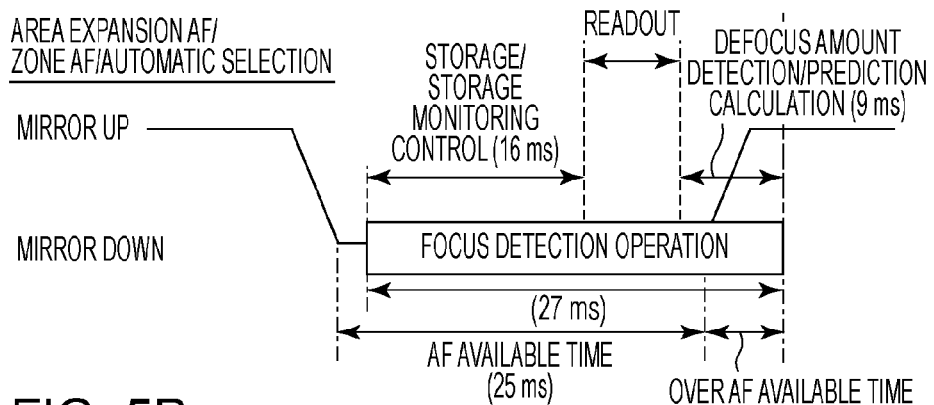

Generation of unstableness in frame rate when a user setting is zone selection, automatic selection, or an area expansion setting is described with reference to FIG. 5A.

The zone AF is a function of dividing AF frames into a plurality of groups, selecting a group, and causing AF frames in the selected group to be a selection subject as AF frames for the focus adjustment. The zone indicates the selected group. The user can select the zone, and hence the user can perform AF frame selection.

Also, the automatic selection is a function of causing all AF frames to be a selection subject as AF frames for the focus adjustment.

Further, the expansion area setting is a function of causing an arbitrary AF frame selected by the user and AF frames around the selected AF frames to be a selection subject, and selecting AF frames, in which the focus is detected and used for the focus adjustment of the lens.

If the method of selecting the AF frames set by the user is the zone selection, the automatic selection, or the area expansion setting, as compared with a case in which an arbitrary single AF frame is selected, the number of line sensors for storage/readout is increased, and the focus detection time is extended. In the case of arbitrary selection, if the AF available time is 25 ms and the focus detection time takes 23 ms, the focus detection time is within the AF available time. In contrast, if the number of AF frames is increased like the case of the area expansion, the number of the line sensors for storage/readout is increased, and the focus detection time is extended (27 ms). Then, the focus detection time is not within 25 ms of the AF available time.

In this case, the waiting time for the storage monitoring control is reduced and hence the start timing for reading out the signal is advanced, so that the focus detection time becomes within the AF available time.

Figure 5B:
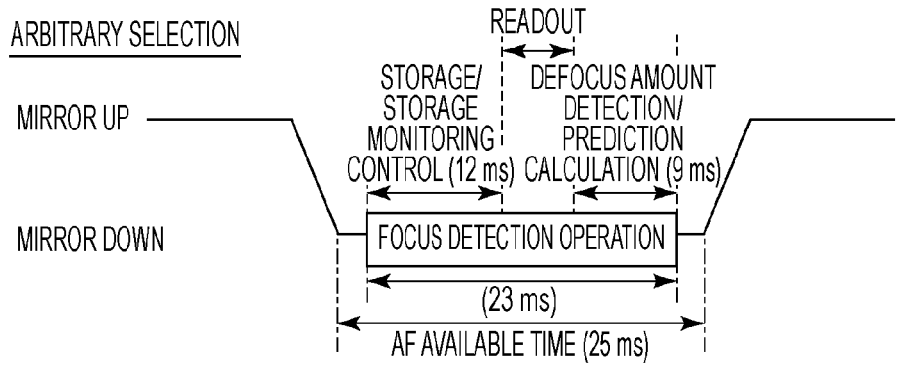
Figure 5B:
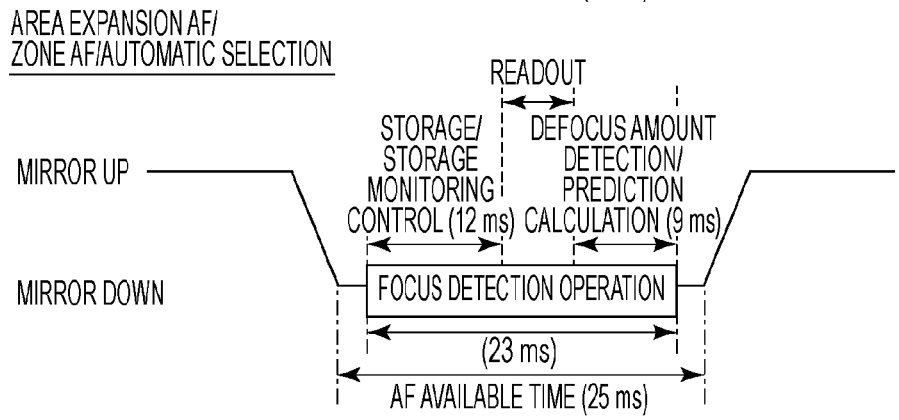
Figure 6A:
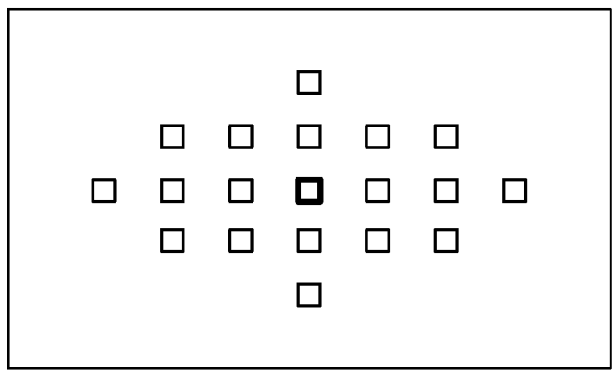
FIGS. 6A to 6D provide illustrations each showing a selection mode of an AF frame.
Figure 6B:
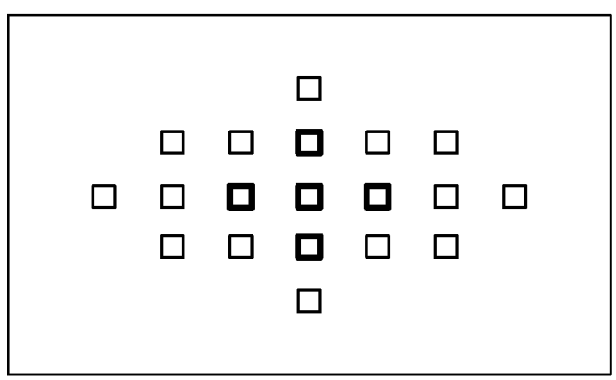
Figure 6C:
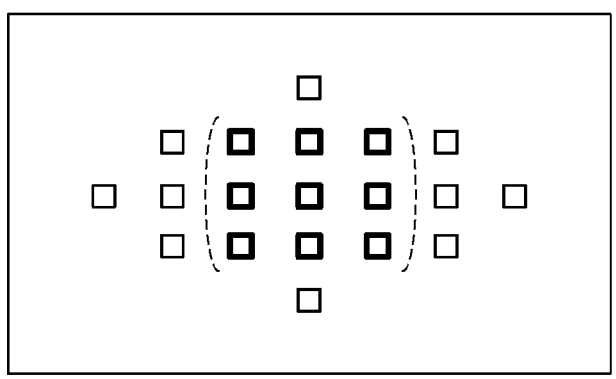
Figure 6D:
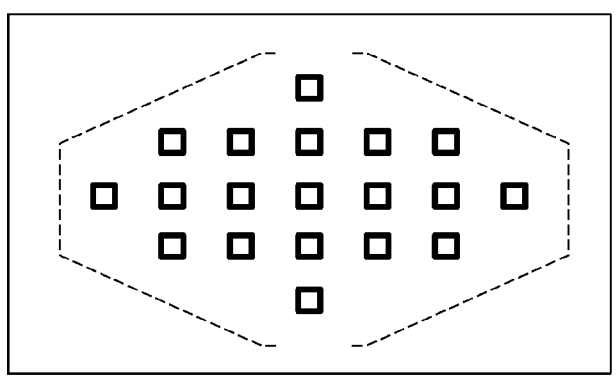

FIG. 5B is an illustration showing a state in which the waiting time for the storage monitoring control is reduced by 5 ms and hence the start timing for reading out the signal is advanced, so that the focus detection time becomes 23 ms and becomes within the AF available time (25 ms).

As described above, since the focus detection time is reduced by reducing the waiting time for the storage monitoring control, the focus detection time becomes within the AF available time and the unstableness in frame rate is reduced.

Similarly, even with the zone selection setting and the automatic selection setting, the number of line sensors is increased as compared with the case of the arbitrary selection setting. The time required for storage/readout is increased, and the focus detection time is extended. Even in this case, the storage monitoring control is sacrificed by a certain degree by advancing the timing for reading out the signal, so that the focus detection time is reduced and the unstableness in frame rate is reduced.

Processing for Reducing Waiting Time for Storage Monitoring Control

Figure 9:
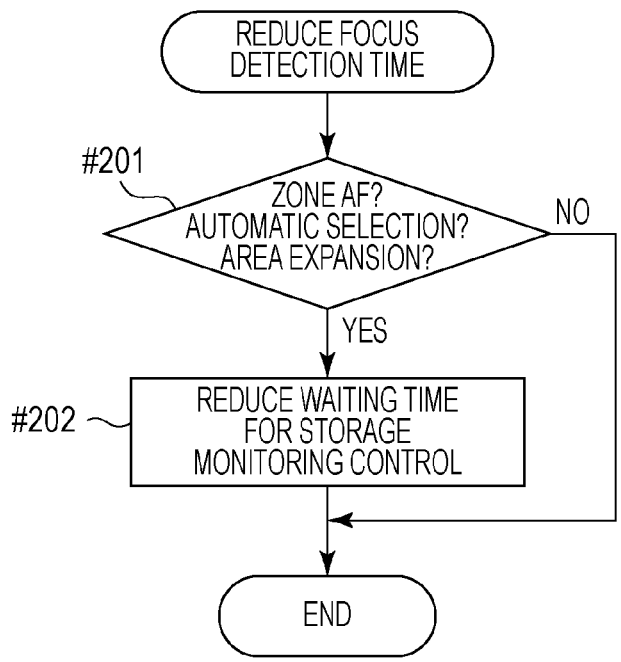
FIG. 9 is a flowchart showing processing for adjusting the waiting time for the storage monitoring control in accordance with AF frame selection set by the user.

FIG. 9 is a flowchart showing processing for reducing the waiting time for the storage monitoring control in accordance with the AF frame selection set by the user.

In step #201, if the AF frame selection set by the user is the zone AF, the automatic selection, or the area expansion setting, the processing goes to step #202. In step #202, the waiting time for the storage monitoring control is set to be shorter than a waiting time set with the arbitrary selection setting.

If the AF frames set by the user in step #201 is a single AF frame, the processing is ended while the current waiting time for the storage monitoring control is not changed.

Generation of Unstableness in Frame Rate

Figure 7A:
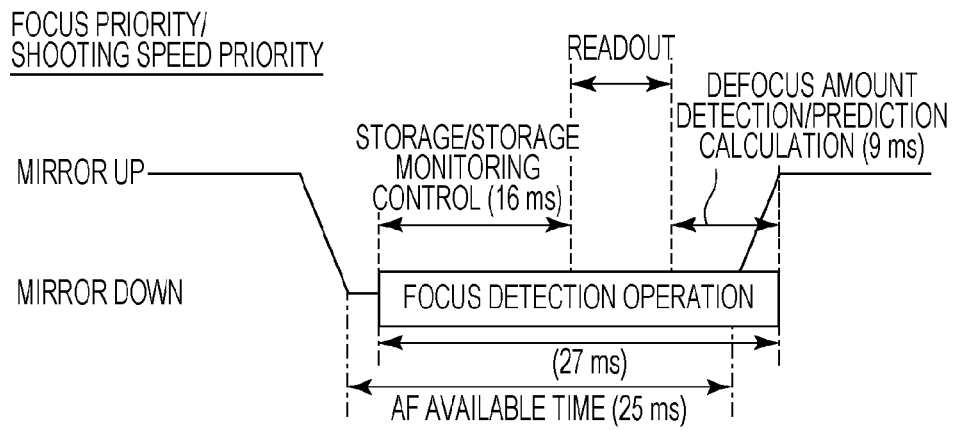
FIGS. 7A and 7B provide illustrations showing a state in which the frame rate becomes unstable when focus priority is set.

Generation of unstableness in frame rate when a user setting is shooting speed priority or focus priority is described with reference to FIG. 7A.

In a situation in which shooting can be performed while unstableness in frame rate is not generated if the AF available time is 25 ms, if the user selects the focus priority, the focus detection time may take 27 ms because the focus detection accuracy has a high priority, the focus detection time is not within the AF available time, and unstableness in frame rate is generated. However, since the focus priority setting is a mode in which shooting is performed such that the focus detection accuracy has precedence over the shooting speed by the will of the user, even if the unstableness in frame rate is generated, the unstableness is allowable.

On the other hand, in the case of the shooting speed priority, shooting is performed such that the set frame rate has a high priority. Hence, the user does not desire that the focus detection time is extended and is not within the AF available time, and hence the unstableness in frame rate is generated.

Therefore, if the shooting speed priority is set, the waiting time for the storage monitoring control is reduced and hence the start timing for reading out the signal is advanced, so that the focus detection time becomes within the AF available time.

Figure 7B:
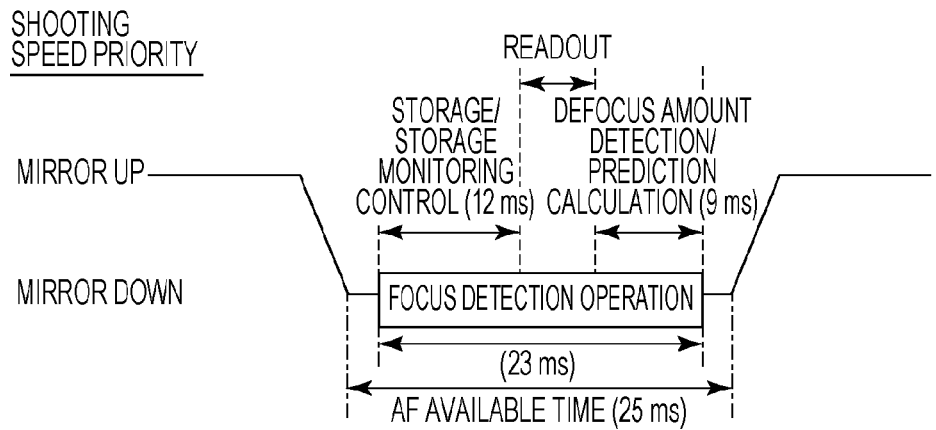

FIG. 7B is an illustration showing a state in which the waiting time for the storage monitoring control is reduced by 4 ms and hence the start timing for reading out the signal is advanced, so that the focus detection time becomes 23 ms and becomes within the AF available time (25 ms). Accordingly, the unstableness in frame rate is reduced.

Processing for Reducing Waiting Time for Storage Monitoring Control

Figure 10:
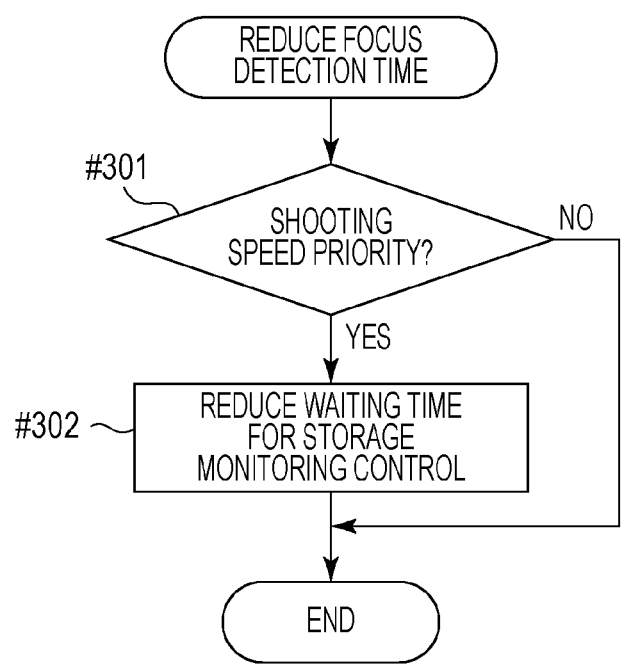
FIG. 10 is a flowchart showing processing for adjusting the waiting time for the storage monitoring control depending on whether or not the setting set by the user is shooting speed priority.

FIG. 10 is a flowchart showing processing for reducing the waiting time for the storage monitoring control depending on whether the setting set by the user is the shooting speed priority setting or the focus priority setting.

In step #301, if the setting set by the user is the shooting speed priority setting, the processing goes to step #302. In step #302, the waiting time for the storage monitoring control is set to be shorter than a waiting time set with the focus priority. If the setting set by the user in step #301 is the focus priority setting, the processing is ended while the current waiting time for the storage monitoring control is not changed.

As described above, the waiting time for the AGC control is adjusted depending on the user settings in the frame rate setting, the AF frame selection setting, and the priority setting.

These user settings may be simultaneously set, or the waiting time for the storage monitoring control may be adjusted even if any of the user settings is set.

SECOND EMBODIMENT

A second embodiment is described below.

The second embodiment has a camera configuration similar to the first embodiment. The focus detection of the image taking lens 201 is performed by using the focus detecting circuit 210, the AF sensors 229a and 229b are controlled, and thus the optimal focus detection is performed.

Method of Controlling AF Sensors

A method of controlling the AF sensors 229a and 229b according to the second embodiment is described.

The unstableness in frame rate is reduced by reducing a prediction calculation time of control (hereinafter, also referred to as serve control) for driving the image taking lens in association with movement of a moving object in a user setting with which the focus detection time is likely extended and the unstableness in frame rate is likely generated, and hence by reducing the focus detection operation time.

The servo control selects a function that is the most suitable for predicting an image plane position in future from a plurality of image plane positions in the past and changes in detection time of the image plane positions, predicts a change in image plane position in future by the selected function, and performs lens driving.

In the prediction calculation of the servo control, the accuracy of the prediction for the change in image plane position in future is increased as the number of samples of the plurality of image plane positions in the past and their detection times is increased. However, the time required for the prediction calculation is increased as a side effect.

As the time required for the prediction calculation is increased, the focus detection time is relatively increased, and the unstableness in frame rate is more likely generated.

The number of samples of the image plane positions in the past and their detection times used for the prediction calculation of the servo control is determined in accordance with the frame rate set by the user, and thus the focus detection time is adjusted.

If the frame rate is increased, the focus detection operation is not within the AF available time, and the unstableness in frame rate may be generated.

Figure 11:
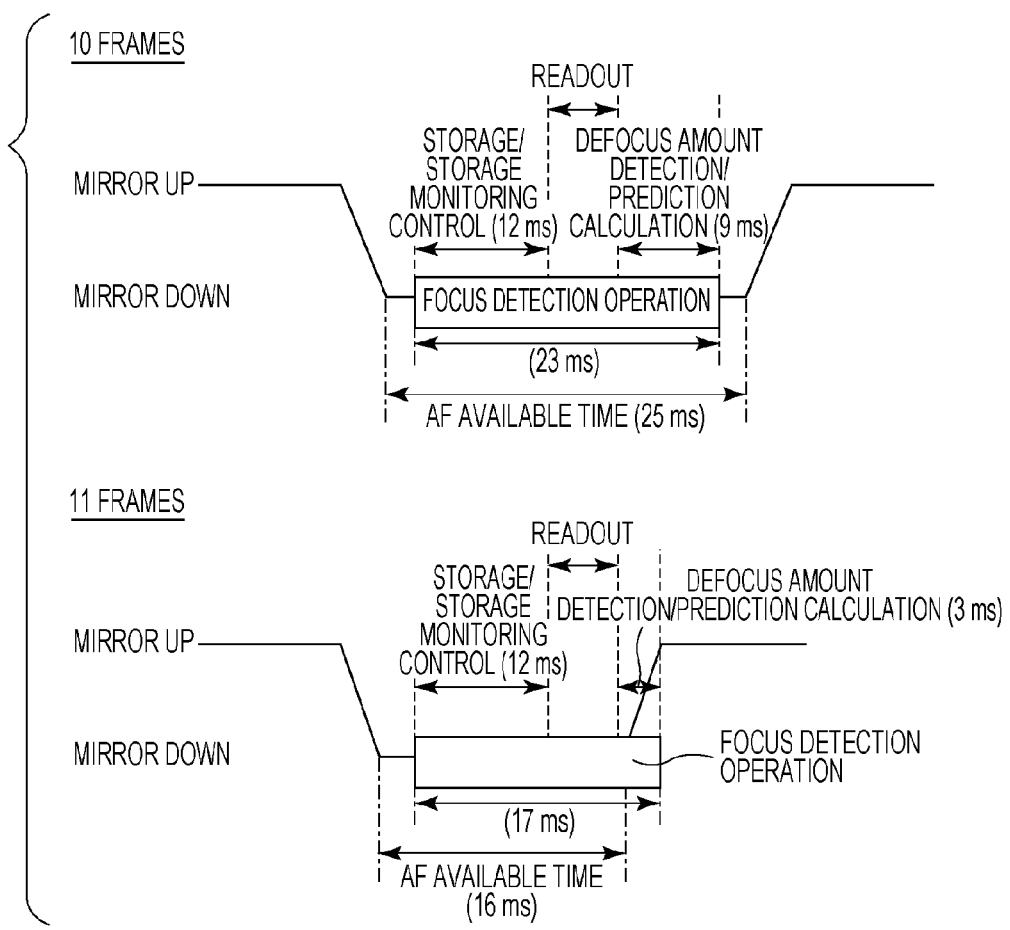
FIG. 11 provides illustrations showing a state in which the frame rate becomes unstable when the frame rate is increased.

As shown in FIG. 4A, when the frame rate is 10 frames and the prediction calculation time of the servo control is 9 ms, if the frame rate is set to be 11 frames, the focus detection time (27 ms) is not within the AF available time (25 ms), and hence the unstableness in frame rate is generated. In this case, for example, although the number of samples of the image plane positions in the past and their detection times used for the prediction calculation is 10 with the frame rate of 10 frames, if the frame rate is set to be 11 frames, the number of samples may be changed to 9 or smaller, and thus the prediction calculation time is reduced. FIG. 11 provides illustrations showing a state in which the unstableness in frame rate is reduced by reducing the prediction calculation time to be 3 ms and hence changing the focus detection time to be 17 ms, while the focus detection time is sacrificed because it is not within the AF available time (16 ms).

Processing for Adjusting the Number of Samples of AF Results

Figure 14:
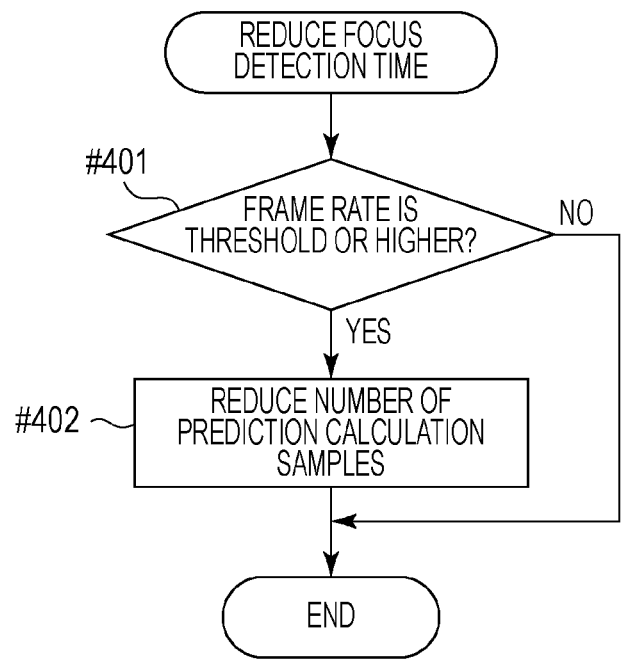
FIG. 14 is a flowchart showing processing for adjusting the number of samples of focus detection results in the past used for the prediction calculation in accordance with the frame rate setting set by the user.

FIG. 14 is a flowchart showing processing for adjusting the number of samples of the focus detection results used for the prediction calculation in accordance with the frame rate setting set by the user.

In step #401, if the frame rate set by the user is higher than a certain threshold, the processing goes to step #402. In step #402, the number of samples of the focus detection results used for the prediction calculation is reduced and the prediction calculation is calculated. If the frame rate is lower than the certain threshold in step #401, the prediction calculation is performed with the current number of samples of the focus detection results used for the prediction calculation.

If the user selects the zone AF, the automatic selection, or the area expansion setting, the number of samples of the image plane positions in the past and their detection times used for the prediction calculation of the servo control is adjusted.

As described in claim 3 of the first embodiment, if the AF frame selection set by the user is the zone AF, the automatic selection, or the area expansion setting, as compared with the arbitrary selection is set, the number of line sensors for storage/readout is increased, and the focus detection time is extended.

Figure 12:
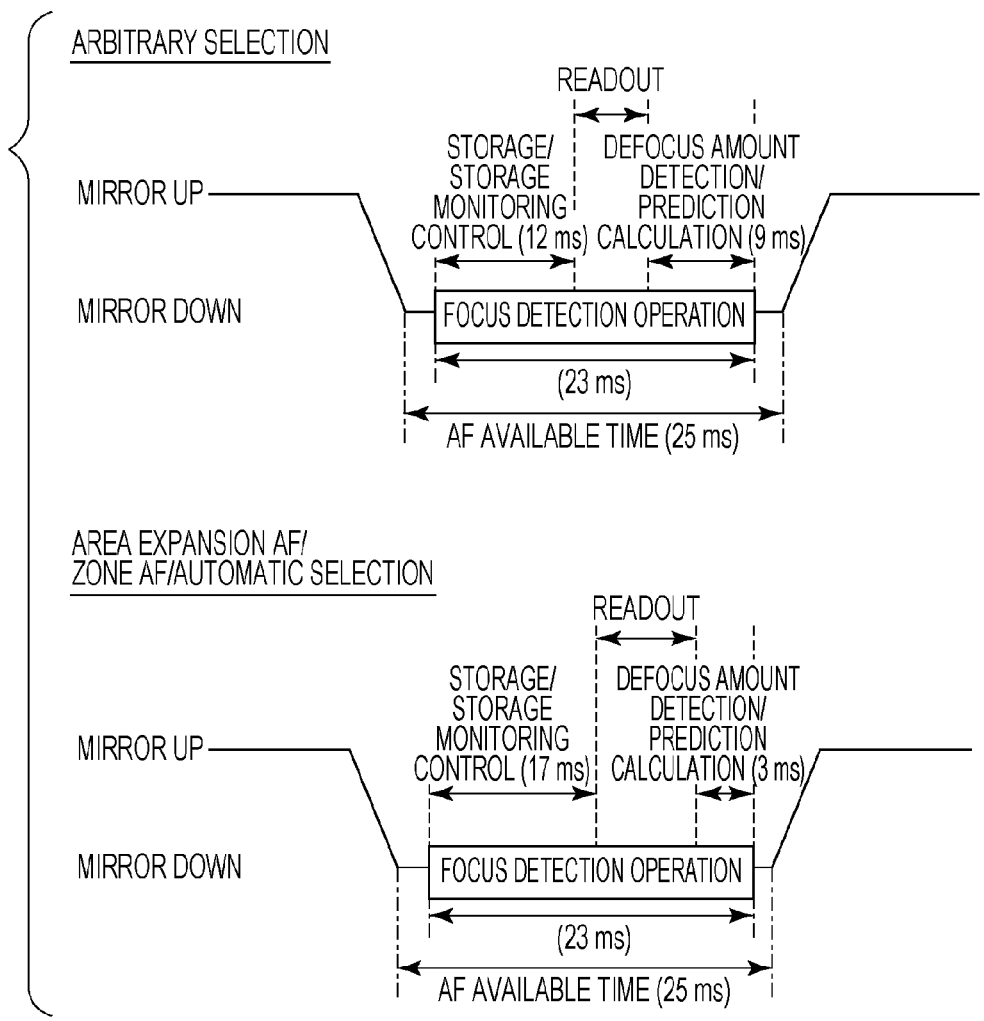
FIG. 12 provides illustrations showing a state in which the frame rate becomes unstable when the number of storage times or readout times in or from the AF sensor is increased.

In this case, for example, although the number of samples of the image plane positions in the past and their detection times used for the prediction calculation is 10 with the arbitrary selection, if the zone AF, the automatic selection, or the area expansion setting is selected, the number of samples may be changed to 9 or smaller, and thus the prediction calculation time is reduced. FIG. 12 provides illustrations showing a state in which the unstableness in frame rate is reduced by reducing the prediction calculation time to be 3 ms and hence changing the focus detection time to be 23 ms, so that the focus detection time becomes within the AF available time (25 ms).

Figure 15:
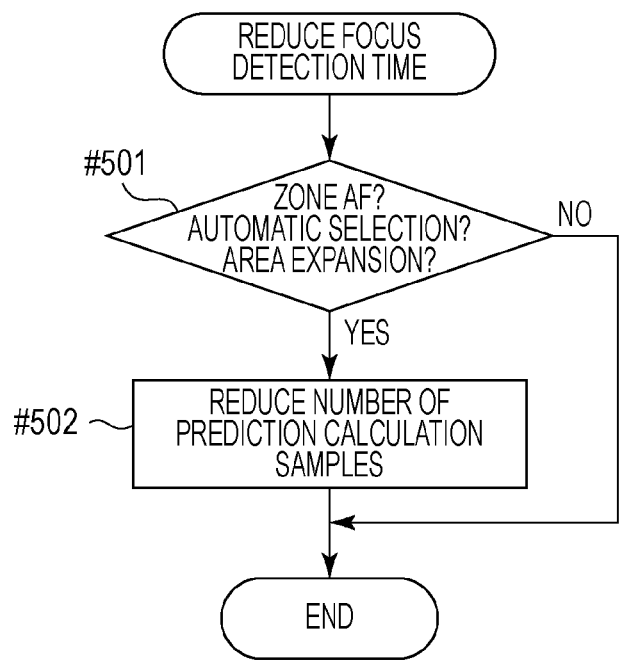
FIG. 15 is a flowchart showing processing for adjusting the number of samples of the focus detection results in the past used for the prediction calculation in accordance with the AF frame selection set by the user.

FIG. 15 is a flowchart showing processing for adjusting the number of samples of the focus detection results used for the prediction calculation in accordance with the AF frame selection set by the user.

In step #501, if the AF frame selection set by the user is the zone AF, the automatic selection, or the area expansion setting, the processing goes to step #502. In step #502, the number of samples of the focus detection results used for the prediction calculation is reduced as compared with the number with the arbitrary selection setting, and the prediction calculation is calculated. If the user selects the arbitrary selection in step #501, the prediction calculation is performed with the number of samples of the default setting unchanged.

If the user setting is the shooting speed priority or the focus priority, the number of samples of the image plane positions in the past and their detection times used for the prediction calculation of the servo control is adjusted.

If the user setting is the shooting speed priority, the focus detection operation is not within the AF available time, the unstableness in frame rate is generated, and shooting may not be performed with the set frame rate although the shooting speed has a high priority.

Figure 13:
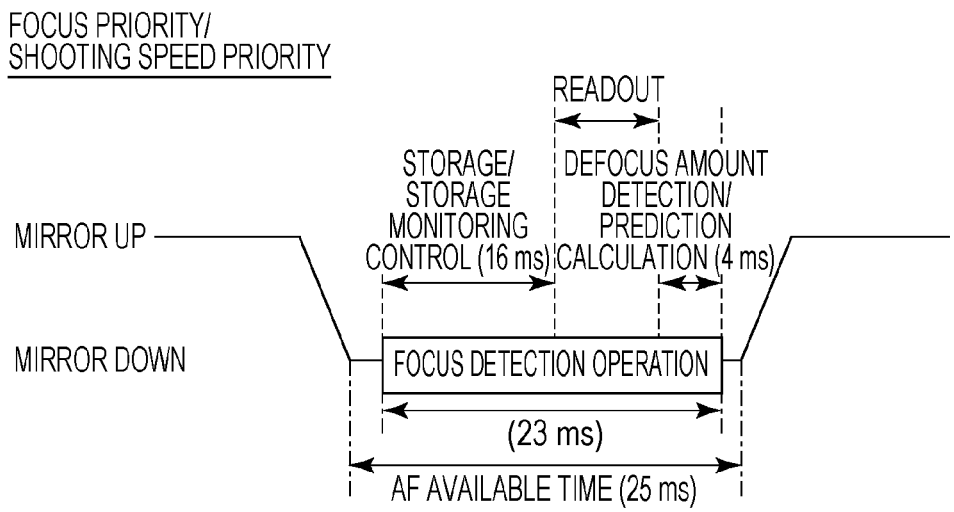
FIG. 13 is an illustration showing a state in which the frame rate becomes unstable when the focus priority is set.

In this case, for example, although the number of samples of the image plane positions in the past and their detection times used for the prediction calculation is 10 with the focus priority, if the shooting speed priority is set, the number of samples may be changed to 9 or smaller, and thus the prediction calculation time is reduced. FIG. 13 is an illustration showing a state in which the unstableness in frame rate is reduced by reducing the prediction calculation time to be 4 ms and hence changing the focus detection time to be 23 ms, so that the focus detection time becomes within the AF available time (25 ms).

Processing for Reducing the Number of Samples of Focus Detection Results

Figure 16:
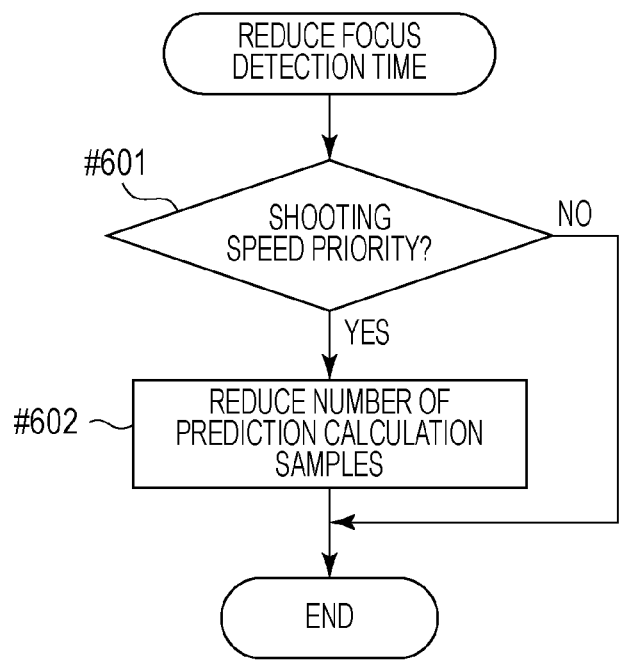
FIG. 16 is a flowchart showing processing for adjusting the number of samples of the focus detection results in the past used for the prediction calculation depending on whether or not the setting set by the user is the shooting speed priority.
Figure 17:
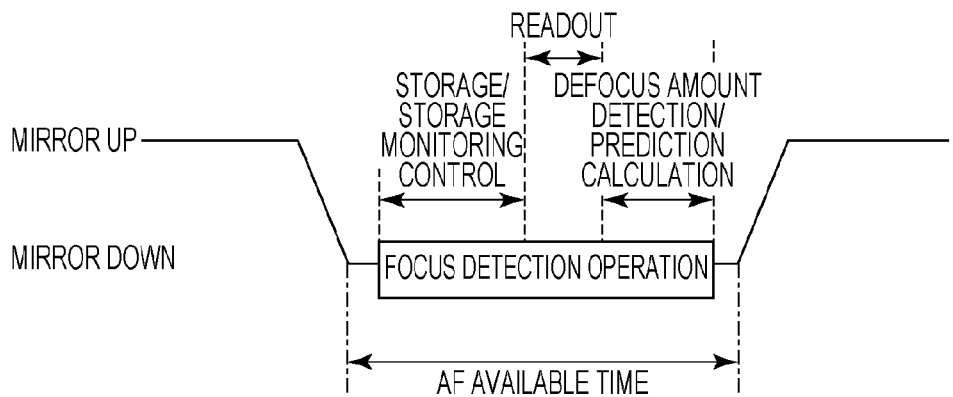
FIG. 17 is an illustration showing a control method of an AF sensor of related art.
Figure 18A:
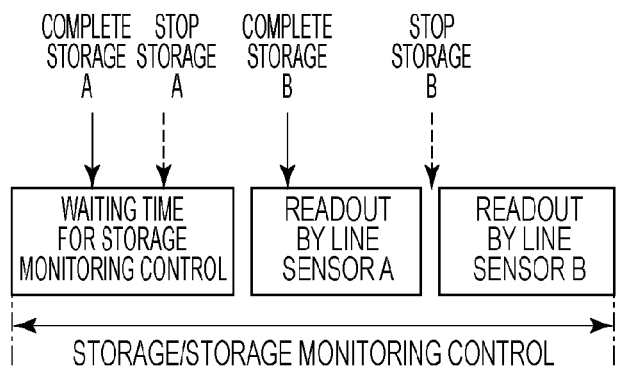
FIGS. 18A and 18B provide illustrations showing storage monitoring control.
Figure 18B:
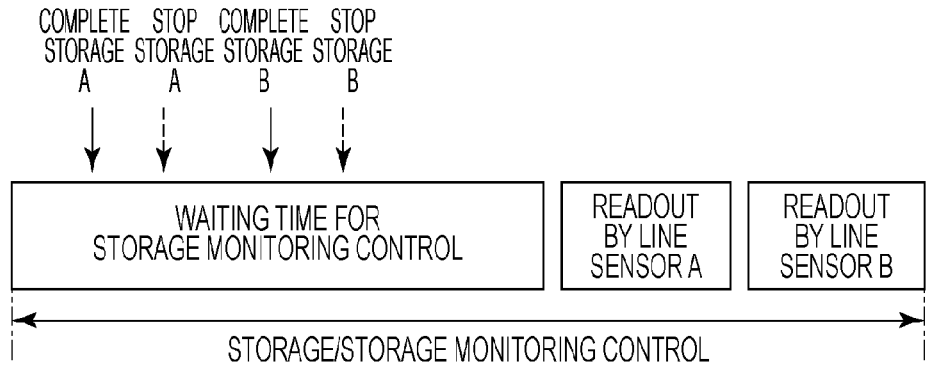

FIG. 16 is a flowchart showing processing of reducing the number of samples of the focus detection results used for the prediction calculation depending on whether the setting set by the user is the shooting speed priority setting or the focus priority setting.

In step #601, if the setting set by the user is the shooting speed priority, the processing goes to step #602. In step #602, the number of samples of the focus detection results used for the prediction calculation is reduced and the prediction calculation is calculated. If the user selects the focus priority setting in step #601, the prediction calculation is performed with the number of samples of the default setting unchanged.

As described above, the focus detection time is adjusted by adjusting the number of samples of the focus detection results used for the prediction calculation depending on the user settings in the frame rate setting, the AF frame selection setting, and the priority setting.

The user settings may be simultaneously set, or the time for the prediction calculation may be adjusted by reducing the number of samples of the focus detection results used for the prediction calculation if any of the settings is set.

Further, the focus detection time may be further reduced by reducing the waiting time for the storage monitoring control according to the first embodiment and by reducing the prediction calculation time according to the second embodiment. The optimal focus detection can be performed depending on the user setting.

With this application, the focus detection technique that markedly reduces the unstableness in frame rate as compared with the related art can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus available for continuous shooting, comprising:
   a sensor that performs photoelectric conversion in accordance with an object image, stores electric charges, and outputs an object signal;
   focus detecting means for detecting a defocus amount from the object signal;
   focus adjusting means for performing focus adjustment for an image taking lens based on the defocus amount; and
   control means for controlling the sensor, wherein during continuous shooting, the controller compares a frame rate of the continuation shooting set by a user to a threshold,
      if the frame rate is the threshold or higher, then the controller reduces a waiting time from when storage of electric charges in the sensor is started until the electric charges are read out; and
      if the frame rate is lower than the threshold, then the controller does not change the waiting time from when the storage of electric charges in the sensor is started until the electric charges are read out.

2. The image pickup apparatus according to claim 1, comprising the control means for controlling the sensor so that, during the continuous shooting, if the frame rate number of shooting times per unit time set by the user since the sensor starts storing the electric charges is a first number, the sensor outputs the object signal after a predetermined time elapses, the predetermined time being shorter than a predetermined time of a second number, the second number being smaller than the first number.

3. The image pickup apparatus according to claim 1, further comprising a mirror that can be shifted between a first state in which the mirror guides the object image to the sensor and a second state in which the mirror guides the object image to a second sensor, wherein the shift of the mirror is repeated during the continuous shooting, and wherein the sensor stores the electric charges after the mirror is shifted from the second state to the first state.

4. An image pickup apparatus including a plurality of AF frames, comprising:
   a sensor that performs photoelectric conversion in accordance with an object image, stores electric charges, and outputs an object signal;
   focus detecting means for detecting a defocus amount from the object signal;
   focus adjusting means for performing focus adjustment for an image taking lens based on the defocus amount;
   changing means for changing a selection subject of an AF frame used for the focus adjustment of the image taking lens from the plurality of AF frames; and
   control means for controlling the sensor so that the sensor outputs the object signal after a predetermined time elapses since the sensor starts storing the electric charges, the predetermined time varying in accordance with the change by the changing means;
   wherein, if the number of selection subjects of the AF frames used for the focus adjustment of the image taking lens is a first number, the predetermined time is shorter than a predetermined time of a second number, the second number being smaller than the first number.

5. A method for controlling an image pickup apparatus available for continuous shooting, comprising:
   a step of performing photoelectric conversion in accordance with an object image, storing electric charges, and outputting an object signal by a sensor;
   a step of detecting a defocus amount from the object signal by focus detecting means;
   a step of performing focus adjustment for an image taking lens based on the defocus amount by focus adjusting means; and
   a step of controlling the sensor, wherein during continuous shooting, the controller compares a frame rate of the continuation shooting set by a user to a threshold,
      if the frame rate is the threshold or higher, then the controller reduces a waiting time from when storage of electric charges in the sensor is started until the electric charges are read out; and if the frame rate is lower than the threshold, then the controller does not change the waiting time from when the storage of electric charges in the sensor is started until the electric charges are read out.

6. A method of controlling an image pickup apparatus including a plurality of AF frames, comprising:
a step of performing photoelectric conversion in accordance with an object image, storing electric charges, and outputting an object signal by a sensor;
a step of detecting a defocus amount from the object signal by focus detecting means;
a step of performing focus adjustment for an image taking lens based on the defocus amount by focus adjusting means; and
a step of changing a selection subject of an AF frame used for the focus adjustment of the image taking lens from the plurality of AF frames; and
a step of controlling the sensor so that the sensor outputs the object signal after a predetermined time elapses since the sensor starts storing the electric charges, the predetermined time varying in accordance with the change result by the changing means;
wherein, if the number of selection subjects of the AF frames used for the focus adjustment of the image taking lens is a first number, the predetermined time is shorter than a predetermined time of a second number, the second number being smaller than the first number.

7. An image pickup apparatus available for continuous shooting, comprising:
a sensor that performs photoelectric conversion in accordance with an object image, stores electric charges, and outputs an object signal;
a focus detecting circuit for detecting a defocus amount from the object signal;
focus adjusting circuit for performing focus adjustment for an image taking lens based on the defocus amount; and
a control circuit for controlling the sensor, wherein during continuous shooting, the controller compares a frame rate of the continuation shooting set by a user to a threshold,
if the frame rate is the threshold or higher, then the controller reduces a waiting time from when storage of electric charges in the sensor is started until the electric charges are read out; and if the frame rate is lower than the threshold, then the controller does not change the waiting time from when the storage of electric charges in the sensor is started until the electric charges are read out.

8. The image pickup apparatus according to claim 7, comprising the control circuit for controlling the sensor so that, during the continuous shooting, if the frame rate number of shooting times per unit time set by the user since the sensor starts storing the electric charges is a first number, the sensor outputs the object signal after a predetermined time elapses, the predetermined time being shorter than a predetermined time of a second number, the second number being smaller than the first number.

9. The image pickup apparatus according to claim 7, further comprising a mirror that can be shifted between a first state in which the mirror guides the object image to the sensor and a second state in which the mirror guides the object image to a second sensor, wherein the shift of the mirror is repeated during the continuous shooting, and wherein the sensor stores the electric charges after the mirror is shifted from the second state to the first state.

10. An image pickup apparatus including a plurality of AF frames, comprising:
a sensor that performs photoelectric conversion in accordance with an object image, stores electric charges, and outputs an object signal;
focus detecting circuit for detecting a defocus amount from the object signal;
focus adjusting circuit for performing focus adjustment for an image taking lens based on the defocus amount;
a changing circuit for changing a selection subject of an AF frame used for the focus adjustment of the image taking lens from the plurality of AF frames; and
control circuit for controlling the sensor so that the sensor outputs the object signal after a predetermined time elapses since the sensor starts storing the electric charges, the predetermined time varying in accordance with the change by the changing circuit;
wherein, if the number of selection subjects of the AF frames used for the focus adjustment of the image taking lens is a first number, the predetermined time is shorter than a predetermined time of a second number, the second number being smaller than the first number.

* * * * *